March 26, 1929.  M. H. REYMOND  1,706,967
PROCESS AND APPARATUS FOR MEASURING THE MATERIAL REQUIRED
TO CUT IRREGULAR SHAPED PATTERNS
Filed Feb. 19, 1927
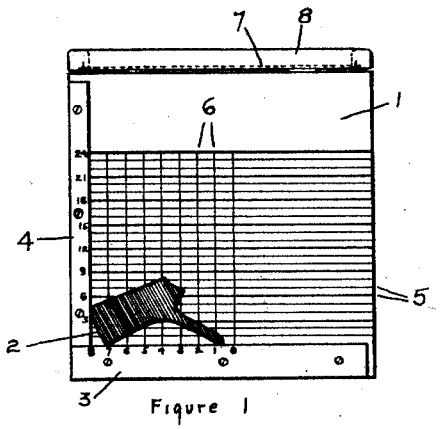
| Number of Apertures | Footage-2 Pcs. Per Pr. | Footage-4 Pcs. Per Pr. |
|---|---|---|
| 50 | 20 | 40 |
| 51 | 20 | 41 |
| 52 | 21 | 42 |
| 53 | 21 | 42 |
| 54 | 22 | 43 |
| etc. | etc. | etc. |
Figure 5
Figure 1
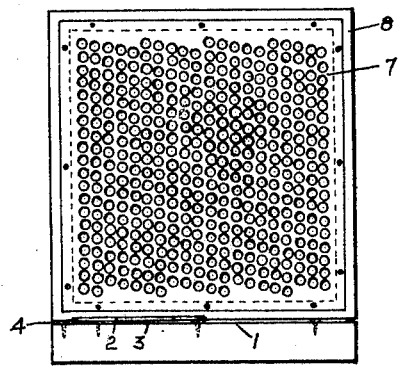
Figure 2
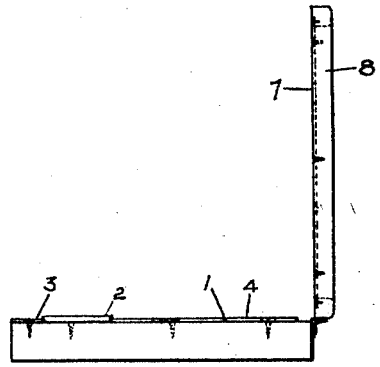
Figure 3
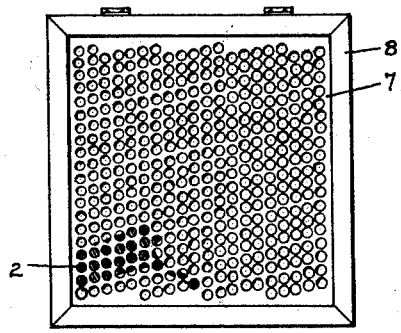
Figure 4
Inventor:
Martin H. Reymond Patented Mar. 26, 1929.

1,706,967

UNITED STATES PATENT OFFICE.

MARTIN H. REYMOND, OF BINGHAMTON, NEW YORK.

PROCESS AND APPARATUS FOR MEASURING THE MATERIAL REQUIRED TO CUT IRREGULAR-SHAPED PATTERNS.

Application filed February 19, 1927. Serial No. 169,584.

The object of this invention is to provide a simple, rapid, accurate, and strictly mechanical process and apparatus for determining the amount of material required to cut patterns of irregular outline such as used in the uppers of shoes. This does not mean determining the area of the pattern nor a figure directly proportional with the area, but means a figure that includes both the area and a proper wastage allowance over this area depending on the shape and perimeter as well as the size of the pattern. In other words it means a figure that correctly reflects the amount of material required to cut a pattern of any particular size, shape, and perimeter.

The invention comprises: the process of indicating over the surface of the pattern and the surrounding territory regular small areas, determining the number of such areas which include any portion of said pattern, and by reference to a conversion table determining from this number of areas the material required. It further involves such a process in which said areas are in the neighborhood of a certain size. It further involves locating said pattern relatively to a gauge line fixed relatively to said areas. It further involves determining additional areas depending on the depth of certain hollows around said pattern. It further involves determining additional areas depending on a specified major dimension of the pattern.

The invention also comprises: an apparatus for conveniently carrying out this process. In preferred form it comprises a regularly apertured screen, in various combinations with other elements. One of these other elements consists of means for definitely locating the pattern relatively to the apertures in said screen. Said means may comprise: a surface on which to lay the pattern, means for definitely locating the pattern on said surface, and means for definitely locating said screen over said surface. This invention also involves a definite form of locating means, depth and length lines as will be described, an inclination of rows of apertures in said screen, a certain size of apertures, and a certain spacing of depth and length lines. Such an apparatus is illustrated in the accompanying drawing. It might be called a patternmeter.

Referring to the drawing, Figure 1 is a top view showing the elementary parts of such an apparatus, including a pattern located for measurement. Figure 2 is a front elevation of this apparatus. Figure 3 is a side elevation of this apparatus. Figure 4 is a top view of this apparatus with the screen lowered on the pattern for use.

Fig. 5 illustrates one form of a conversion table for changing from apertures to footage per pair. The same numbers in the various views represent similar parts.

Screen 7 might be made of sheet metal with apertures in the form of drilled and chamfered holes. Or it might be of transparent material with the apertures clear and the rest of the surface opaque. For rigidity this screen is shown held in a frame 8. This frame and screen is shown definitely located over base 1, by means of hinges. Base of surface 1 may conveniently be of wood, and gauge strips 3 and 4 of metal. These gauge strips provide a definite means for locating any pattern, as will be described, thus eliminating varying results on the same pattern, and insuring greater accuracy. Lines 5, on surface 1 and parallel to gauge strip 3, are of use as will be explained presently. These lines will be referred to as "depth" lines. Lines 6, on surface 1 and parallel to gauge strip 4, are of use as will be explained presently. These lines will be referred to as "length" lines. Depth lines 5 are numbered from gauge strip 3 upwards.

A satisfactory way to locate a pattern has been found to be as follows: Place the pattern against gauge strip 3, (1) so its crosses the least possible number of depth lines, and (2) so it gives the longest possible contact with gauge strip 3 consistent with fulfilling condition (1). By length of contact is meant the distance between the two most extreme points of contact. Then slide pattern over against gauge strip 4, placing whichever end against gauge strip 4 that brings the left hand point of contact with gauge strip 3 the nearest to gauge strip 4, this of course being without violating conditions (1) and (2).

Having located the pattern, a preferred method of measuring the material required to cut this pattern is as follows: Note the number of the lowest depth line that the pattern crosses or touches. Call this the initial count. Bring down screen 7 over the pattern, and, beginning with the initial count, count the apertures in which any part of the pattern appears. Raise screen. Count one additional aperture for each depth line, at least one length line wide, visible in any hollow when the two peak points on each side of such hollow touch gauge strip 3. The expression—one length line wide—means a width equal to the distance between two adjacent length lines. Then turn pattern consecutively to every other hollow and similarly count one additional aperture for each depth line, at least one length line wide, visible in such hollows. This total count is an index of the measurement required.

It has been found by experiment that there is a definite relationship between this total count and the footage required to cut a material of fixed cutting quality. Figure 5 illustrates the general principle of a conversion table, built up from such experiment, for converting from total count (or what might be called total apertures or total small areas) to footage per pair. The total count is of course for one piece. Inasmuch as there are usually either two or four pieces of a certain shape in a pair of shoes for example, the conversion table shown in Figure 5 is made up for two and four pieces per pair. Simply look up alongside the total number of apertures the required footage depending on whether there are 2 or 4 pieces per pair. This table not only is a very easy and convenient method of conversion, but also provides a means for allowing the right extra footage depending on the size of the pattern, all in this same simple operation.

It will be noted that the rows of apertures in screen 7 are inclined to gauge strip 3. This is so as not to have, for example on narrow straps, any sudden jump as the width increases, which would occur if such rows of apertures were parallel to this gauge strip. Gauge strip 3, or equivalent ridge or line, is the essential part of the locating means, it being conceivable to substitute some other construction for gauge strip 4, although gauge strip 4 is a preferred construction.

For measuring shoe patterns and giving the right wastage allowance on complicated straps and trimmings as against plain patterns, and taking into account various practical considerations, a size of aperture of ½ inch diameter spaced one to every .39 square inch has been found to work out satisfactorily. Of course further experience may indicate another size as also satisfactory, but in all probability this will be in the neighborhood of ½ inch, that is it might range from possibly ¼ inch to possibly ¾ inch. In connection with such apertures, a spacing of depth lines that has worked out satisfactorily is in the neighborhood of ½ inch. In connection with such apertures a spacing of length lines that has worked out satisfactorily is in the neighborhood of 1¼ inches.

The above method of locating patterns and obtaining total count is a preferred method which after trying many different methods differing in details seems to be the one that produces the best results.

Explaining the reasons why this apparatus gives an accurate measure of the material required to cut an irregular pattern, these are as follows: The areas indicated over the pattern, counting all partial areas as well as whole areas, reflect the material in the pattern itself plus a waste allowance proportional to the perimeter and to some extent to the shape of the pattern. It is generally true that the longer the perimeter, or in other words the more the complication of outline, the greater the necessary waste allowance. This is properly reflected. As the outline redoubles closely onto itself (such as around multiple straps), the necessary wastage is to some extent reduced. This is also properly reflected. In addition it has been found that the depth of the hollows of a certain dimension or larger around the pattern have an additional direct bearing on the wastage required, the greater the hollow the greater the required wastage. This is properly taken care of by the addition of apertures according to the depth lines in these hollows. On the other hand it has been found that long narrow parts require less wastage in proportion to the perimeter than shorter parts. This is properly taken care of by means of the apertures added according to the initial count. The size of part cut, which has a bearing on wastage required, is taken care of in the conversion table in the same operation as converting from apertures to footage required. All these elements being properly taken into account, the result is naturally an accurate figure reflecting the amount of material required.

The advantages of this invention are: It provides a simpler, more rapid, more accurate, and more strictly mechanical means for determining the footage required for shoe uppers, than any other method. In the past this estimating has been done in some instances by planimeter measurement with different percentages added for different type patterns. But the growing complexity of different types and the impossibility to accurately predetermine the right percentages on radically new styles has caused this method to be largely discarded. Another method has been to lay out the pattern on paper and measure the footage consumed. In many instances this gave but a rather crude result varying with the skill of the person doing the work, and therefore not mechanical. Later developments of this method provided carefully worked out mechanical rules whereby fairly accurate and uniform results were obtained. But at their best none of these methods are as simple, rapid, convenient, and reliable as the present invention.

Of course the above described process and apparatus may be varied in details, the exact scope of the invention being defined in the appended claims.

I claim:

1. The process of determining the amount of material required to cut an irregular shaped pattern, comprising: indicating over this pattern and the surrounding territory regular small areas, determining the number of said areas which include any certain portion of said pattern, determining an additional number of areas depending on the hollows around said pattern, and converting the total of such areas into material required by means of a conversion table substantially as described.

2. The process of determining an index of the amount of material required to cut an irregular shaped pattern, comprising: indicating over this pattern and the surrounding territory regular small areas definitely located relatively to the contour of said pattern, determining the number of said areas which include any certain portion of said pattern, and determining an additional number of areas depending on the depth of specified hollows around said pattern.

3. The process of determining the amount of material required to cut an irregular shaped pattern, comprising: indicating over this pattern and the surrounding territory regular small areas, determining the number of said areas which include any certain portion of said pattern, determining an additional number of areas depending on the hollows around said pattern, determining a further additional number of areas depending on a specified principal dimension of said pattern, and converting the total of such areas into material required by means of a conversion table substantially as described.

4. The process of determining an index of the amount of material required to cut an irregular shaped pattern, comprising: indicating over this pattern and the surrounding territory regular small areas definitely located relatively to the contour of said pattern, determining the number of said areas which include any certain portion of said pattern, determining an additional number of areas depending on the depth of specified hollows around said pattern, and determining a further additional number of areas depending on a specified principal dimension of said pattern.

5. An apparatus for determining the amount of material required to cut an irregular shaped pattern, comprising: means for indicating regular small areas over the pattern and surrounding territory, gauging means for locating the pattern in a definite position relative to said areas, and means for measuring the effect of hollows around the pattern substantially as described, said small areas being in rows inclined to said gauging means.

6. An apparatus for determining the amount of material required to cut an irregular shaped pattern, comprising: a base on which to lay the pattern, a gauge strip on said base, a regularly apertured screen, and means for locating said screen in a definite position over said base, said apertures being in rows inclined to said gauge strip.

7. An apparatus for determining the amount of material required to cut an irregular shaped pattern, comprising: a base on which to lay the pattern, a pair of coordinate gauge strips on said base, a regularly apertured screen, and means for locating said screen in a definite position over said base, said apertures being in the neighborhood of ½″ diameter and in rows inclined to at least one of said gauge strips.

8. In an apparatus for determining the amount of material required to cut an irregular shaped pattern: integrating means for measuring an approximation to the amount of material required, and means provided with depth and length lines substantially as described for measuring the effect of hollows around the pattern, said depth and length lines being properly correlated with said integrating means so measurements obtained in the two instances will be in correct relative proportion.

9. An apparatus for determining the amount of material required to cut an irregular shaped pattern, comprising: means for indicating regular small areas over the pattern, and means for locating said pattern in a definite position relatively to said areas, said apparatus being provided with depth and length lines substantially as described.

10. An apparatus for determining the amount of material required to cut an irregular shaped pattern, comprising: means for indicating regular small areas over the pattern, and a gauge strip for locating said pattern in a definite position relatively to said areas, said areas being in rows inclined to said gauge strip.

11. An apparatus for determining the amount of material required to cut an irregular shaped pattern, comprising: a base on which to lay the pattern, a gauge strip on said base, a regularly apertured screen, and means for locating said screen in a definite position over said base, said apertures being in rows inclined to said gauge strip, and said base being provided with depth lines parallel to said gauge strip.

12. An apparatus for determining the amount of material required to cut an irregular shaped pattern, comprising: a base on which to lay the pattern, a pair of coordinate gauge strips on said base, a regularly apertured screen, and means for locating said screen in a definite position over said base, said apertures being in the neighborhood of ½" diameter and in rows inclined to at least one of said gauge strips, and said base being provided with depth and length lines substantially as described.

MARTIN H. REYMOND.